(12) United States Patent
Lussier et al.

(10) Patent No.: US 10,444,533 B2
(45) Date of Patent: Oct. 15, 2019

(54) EYEWEAR WITH REMOVABLE LENSES

(71) Applicant: Revision Military Inc., Montreal (CA)

(72) Inventors: Pierre-Luc Lussier, Longueuil (CA);
Stéphane Lebel, Quebec (CA); Nicolas Desjardins, Pincourt (CA)

(73) Assignee: Revision Military Inc., Montreal, Quebec ( * ) Notice: Subject to any disclaimer, the term of this patent is extended or adjusted under 35 U.S.C. 154(b) by 0 days.

(21) Appl. No.: 15/595,898

(22) Filed: May 15, 2017

(65) Prior Publication Data

US 2018/0329226 A1 Nov. 15, 2018

(51) Int. Cl.
*G02C 1/08* (2006.01)
*G02C 1/06* (2006.01)
*G02C 1/04* (2006.01)
*G02C 5/02* (2006.01)

(52) U.S. Cl.
CPC .............. *G02C 1/06* (2013.01); *G02C 1/04* (2013.01); *G02C 1/08* (2013.01); *G02C 5/02* (2013.01); *G02C 2200/06* (2013.01); *G02C 2200/08* (2013.01)

(58) Field of Classification Search
CPC .......... G02C 1/08; G02C 5/2209; G02C 5/22; G02C 5/2272; G02C 9/04
USPC ................................... 351/90–101
See application file for complete search history.

(56) References Cited

U.S. PATENT DOCUMENTS

| 2,730,012 | A | 1/1956 | Malcom |
|---|---|---|---|
| 3,801,189 | A | 4/1974 | Bolle |
| 3,826,564 | A | 7/1974 | Werling |
| 5,418,580 | A | 5/1995 | Sondrol |
| 5,467,148 | A | 11/1995 | Conway |
| 6,086,199 | A | 7/2000 | Holland et al. |
| 6,227,665 | B1 | 5/2001 | Pernicka et al. |
| 6,491,388 | B1 | 12/2002 | Chen |
| 6,969,172 | B2 | 2/2005 | Actis-Datta |
| 7,216,971 | B1 | 5/2007 | Chen |

(Continued)

FOREIGN PATENT DOCUMENTS

| DE | 89 954 C | 5/1896 |
|---|---|---|
| DE | 296 10 749 U1 | 9/1996 |

(Continued)

OTHER PUBLICATIONS

[No Author Listed], Adapt bsg-45 / Sport Glasses—Performance. https://bbbcycling.com/en/bike-wear/sport-glasses/BSG 45 [last accessed Jul. 21, 2017].

(Continued)

*Primary Examiner* — Hung X Dang

(74) *Attorney, Agent, or Firm* — Wolf, Greenfield & Sacks, P.C.

(57) ABSTRACT

An eyewear assembly has a frame with removable lenses. The eyewear assembly may include upper and lower frame portions that are separable from one another at a bridge region of the frame using a linkage. A finger actuator actuates the linkage to cause the upper frame to move away from the lower frame, exposing at least one edge of the lenses for removal. The separated upper frame portion and lower frame portion may be held in a stable open position. After lens removal or replacement, the linkage may be actuated to reconnect the upper frame portion and lower frame portion, thereby enclosing the lenses.

26 Claims, 13 Drawing Sheets

(56) References Cited

U.S. PATENT DOCUMENTS

| | | |
|---|---|---|
| 7,497,569 B2 | 3/2009 | Webb |
| 7,524,055 B2 | 4/2009 | Schepke et al. |
| 7,856,673 B2 | 12/2010 | Reed |
| 7,954,942 B2 | 6/2011 | Calilung et al. |
| 8,192,015 B2 | 6/2012 | Taylor et al. |
| 8,408,695 B2 | 4/2013 | Calilung et al. |
| 8,458,823 B2 | 6/2013 | Matera |
| 8,661,562 B2 | 3/2014 | Calilung et al. |
| 8,668,330 B2 | 3/2014 | Reyes et al. |
| 8,800,067 B2 | 8/2014 | Saylor et al. |
| 8,881,316 B2 | 11/2014 | Reyes et al. |
| 8,911,076 B2 | 12/2014 | Calilung et al. |
| 8,992,007 B2 * | 3/2015 | Li .................... G02C 7/086 351/124 |
| 2010/0085533 A1 * | 4/2010 | Calilung ............. G02C 1/06 351/90 |
| 2013/0000019 A1 | 1/2013 | Okuma et al. |
| 2015/0370088 A1 | 12/2015 | Damin et al. |
| 2016/0103333 A1 | 4/2016 | DiChiara et al. |

FOREIGN PATENT DOCUMENTS

| | | |
|---|---|---|
| EP | 0 308 696 A1 | 3/1989 |
| FR | 1 090 623 A | 4/1955 |
| FR | 2 800 173 B1 | 6/2003 |
| GB | 2 181 859 A | 4/1987 |

OTHER PUBLICATIONS

[No Author Listed], BBB Cycling Glasses Manual. https://bbbcycling.com/content/uploads/2015/11/BSG-45_45PH_45SE_Adap-_Adapt-PH-Adapt- Special-Edition.pdf [last accessed Jul. 26, 2017].

BBB Cycling product movie: BSG-45 Adapt sport glasses (EN). Uploaded by BBB Cycling on May 4, 2015. Vimeo video. Retrieved from https://vimeo.com/126775601 (DVD enclosed).

International Search Report and Written Opinion dated Sep. 20, 2018 in connection with International Application No. PCT/IB2018/000860.

* cited by examiner

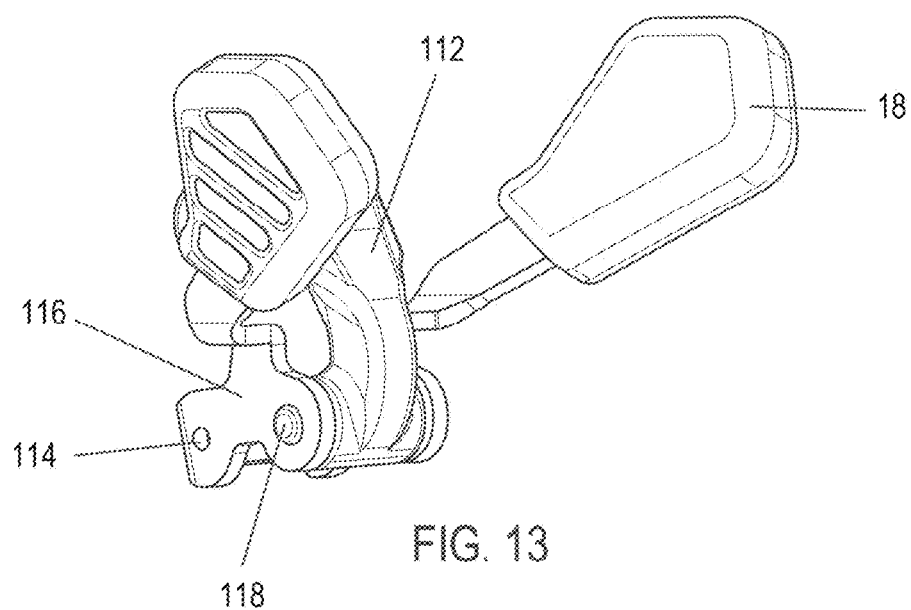

EYEWEAR WITH REMOVABLE LENSES

FIELD

Disclosed embodiments are related to eyewear assemblies with removable lenses and methods of removing the lenses.

DISCUSSION OF THE RELATED ART

Eyewear is used to protect a user's eyes or provide vision correction. Glasses may have a single lens that extends across both eyes, or may have two separate lenses held by a frame. The lenses may filter out different types of light, reduce glare or brightness, or provide a prescription to correct a user's vision. The lens and eyewear frame also may protect a user's eyes from impact or projectiles.

SUMMARY

According to one embodiment, an eyewear assembly includes a frame arranged to hold first and second lenses, the frame including an upper frame portion and a lower frame portion, the upper frame portion and the lower frame portion being separable at a bridge region to move the frame from a closed position to an open position. The assembly also includes a linkage coupling the upper frame portion to the lower frame portion. The linkage includes a first link pivotally connected to the upper frame portion, and a second link pivotally connected to the lower frame portion. The first link is pivotally connected to the second link.

According to another embodiment, a method of removing first and second lenses from an eyewear frame is described. The eyewear frame having an upper frame portion, a lower frame portion, and a linkage connecting the lower frame portion to the upper frame portion. The method includes rotating a finger actuator attached to the linkage, the finger actuator rotating a first link pivotally connected to the upper frame portion, and the rotation of the first link rotating a second link pivotally connected to the lower frame portion such that the upper frame portion and the lower frame portion separate at a bridge region to move the frame from a closed position to an open position. The method further includes removing the first and second lenses from the eyewear frame.

According to a further embodiment, an eyewear assembly includes a frame arranged to hold first and second lenses, the frame including an upper frame portion and a lower frame portion, the upper frame portion and the lower frame portion being separable at a bridge region to move the frame from a closed position to an open position. The assembly includes a linkage coupling the upper frame portion to the lower frame portion, the linkage being actuable to separate the upper frame portion and the lower frame portion being separable at the bridge region. Further included is a finger actuator connected to the linkage at a first pivot joint, wherein the first pivot joint has an axis which is parallel finger actuator rotates to an imaginary line connecting symmetrically opposite points at lateral ends of the frame.

According to yet another embodiment, a method of removing first and second lenses from an eyewear frame is disclosed. The eyewear frame having an upper frame portion, a lower frame portion, and a linkage connecting the lower frame portion to the upper frame portion. The includes pivoting a finger actuator of the linkage about an axis of the linkage that is parallel to an imaginary line connecting symmetrically opposite points at lateral ends of the frame, the pivoting of the finger actuator in turn separating the upper frame portion from the lower frame portion in a bridge region of the frame. The method also includes removing the first and second lenses from the frame.

According to a further embodiment, an eyewear assembly includes a frame arranged to hold first and second lenses, the frame including an upper frame portion with a support surface in a bridge region, and a lower frame portion with a resting surface in the bridge region. The upper frame portion is moveable away from the lower frame portion in the bridge region in an upward direction and a forward direction to move the frame from a closed position to an open position such that the first and second lenses are removable from the frame.

According to another embodiment, a method of removing lenses from an eyewear assembly is disclosed. The eyewear assembly including a frame having an open position and a closed position, wherein the lenses are held by the frame when the frame is in the closed position. The method includes actuating a finger actuator to move an upper frame portion upwardly and forwardly away from a lower frame portion in a bridge region of the frame. The method also includes removing the lenses from the frame.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 13 shows the frame linkage of FIG. 11 in a fully opened position.

DETAILED DESCRIPTION

Figure 1:
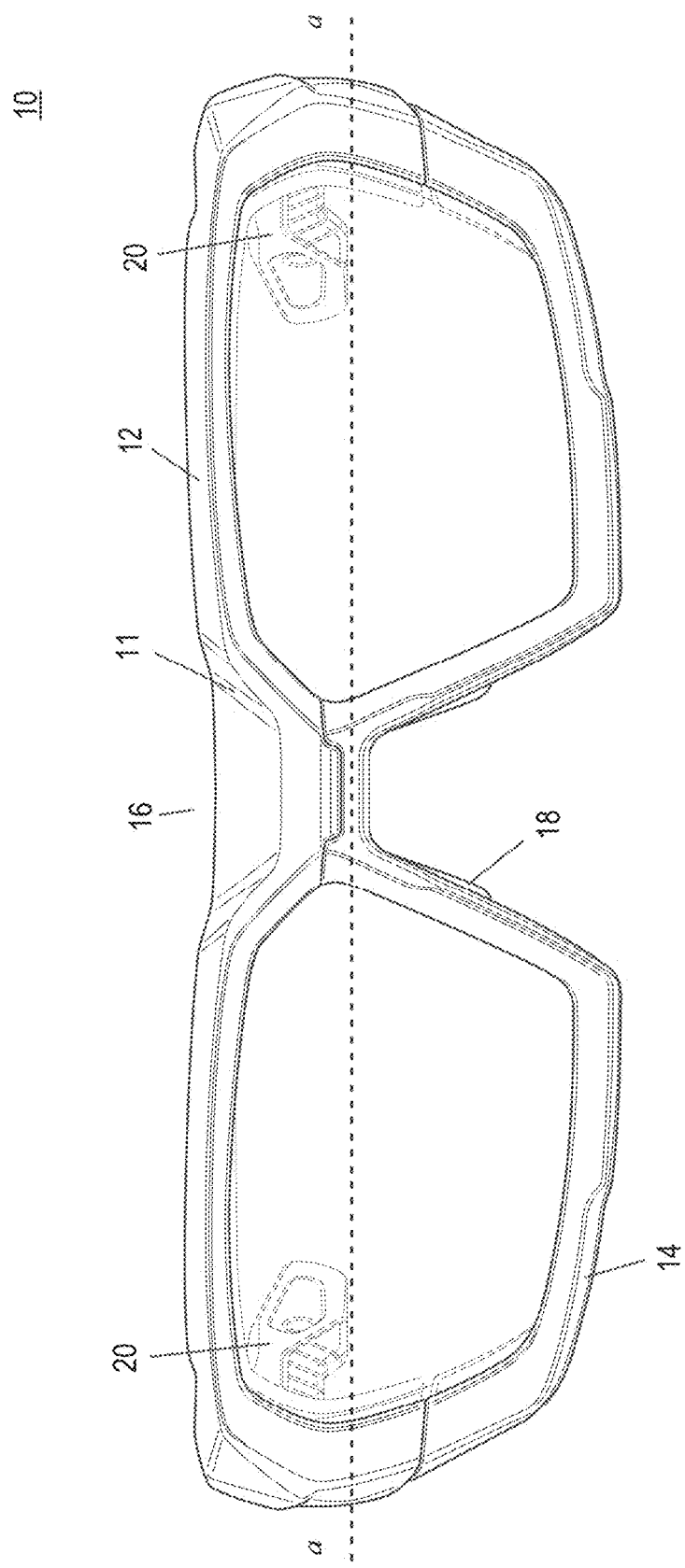
FIG. 1 is a front plan view of an eyewear assembly according to one embodiment.
Figure 2:
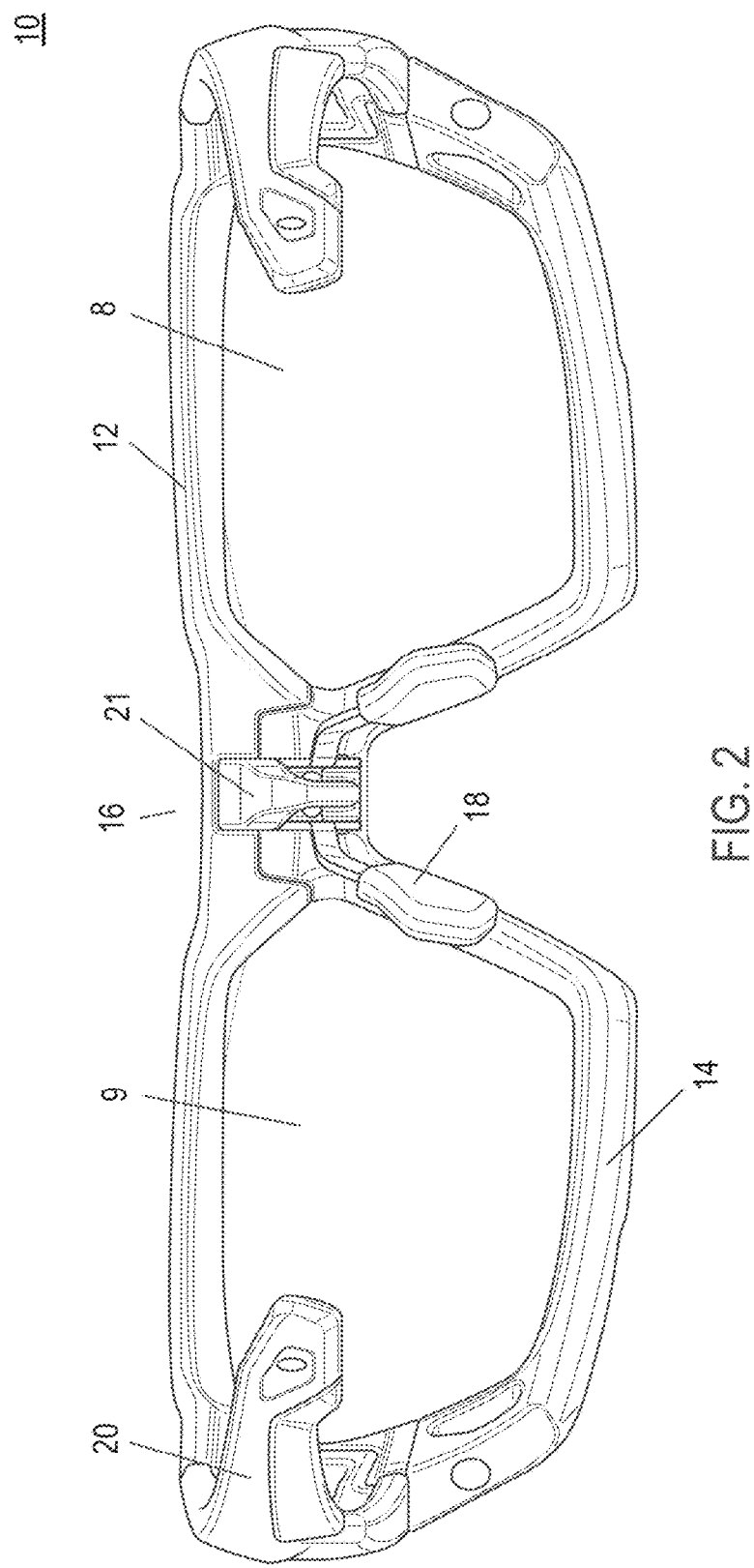
FIG. 2 is a rear plan view of the eyewear assembly of FIG. 1.
Figure 3:
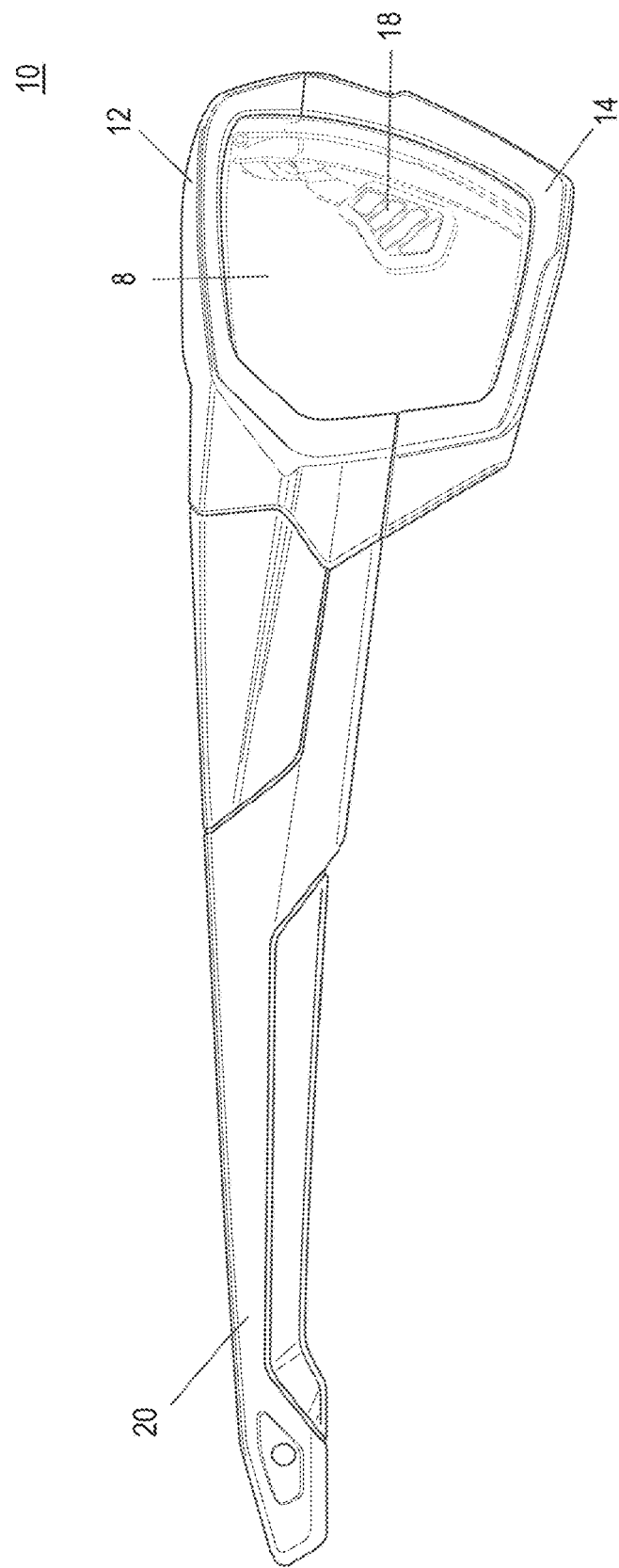
FIG. 3 is a left side elevation view of the eyewear assembly of FIG. 1.
Figure 4:
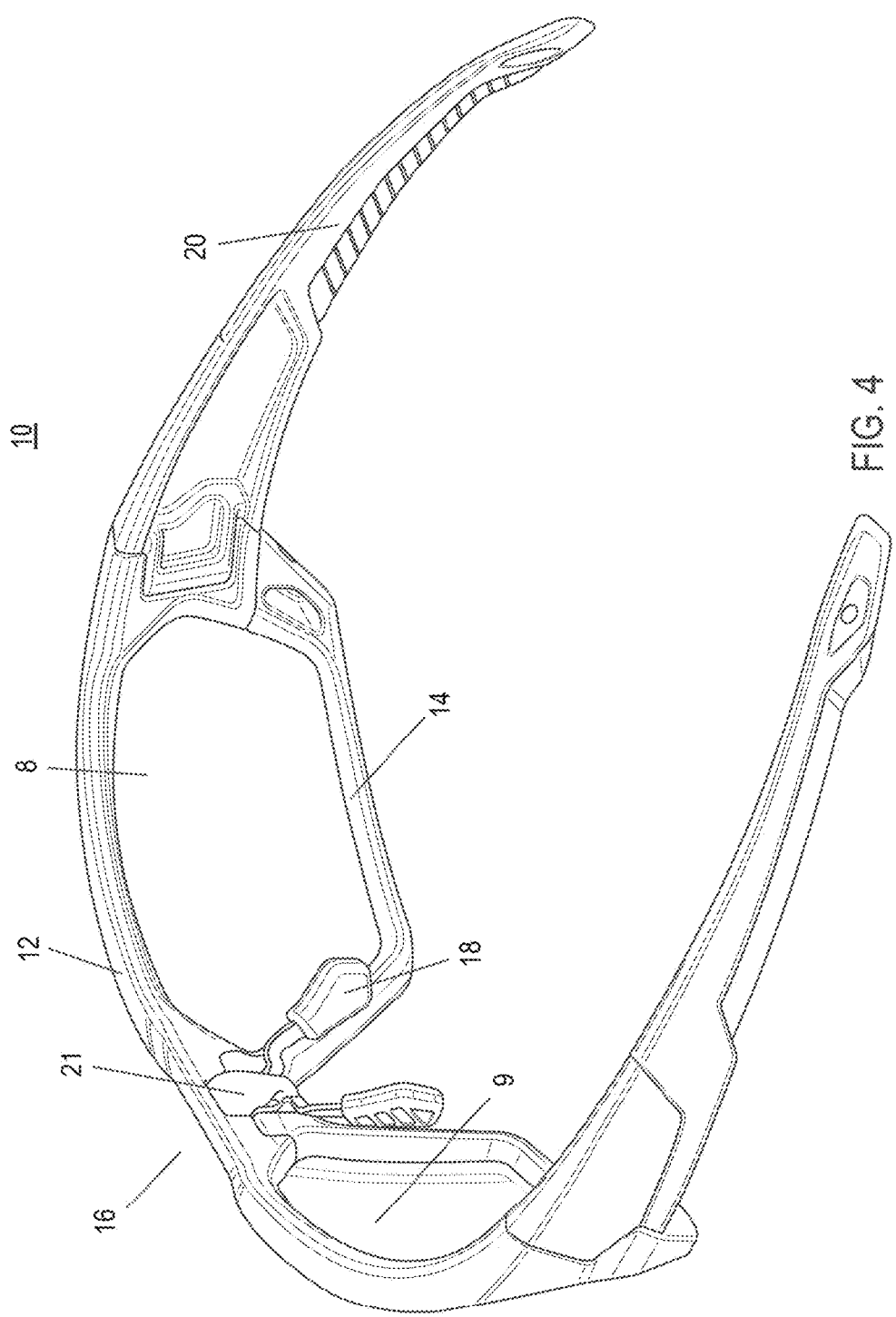
FIG. 4 is a top rear right side elevation view of the eyewear assembly of FIG. 1.

Applicant has recognized and appreciated drawbacks associated with typical eyewear assemblies that require the eyewear frame to be disassembled with tools to remove the lenses. During use, the lenses can be damaged and develop scratches, cracks, or other permanent flaws that degrade the quality of vision and/or protection. In such a situation, a user may wish to replace or repair a lens rather than switch to a difference piece of eyewear. Even in cases where no damage occurs, a user may want to use different types of lenses without having to carry multiple eyewear assemblies or having to fully disassemble an eyewear frame to switch lenses. For users, it can be inconvenient to disassemble eyewear each time a lens is replaced or traded for a different lens. Additionally, reducing the amount of time it takes to switch lenses can reduce a user's vulnerability if he or she is in a high risk environment.

In view of the above, Applicant has recognized that an eyewear assembly with removable lenses provides a convenient way for a user to change lenses, and a built-in mechanism on the eyewear assembly may separate the frame of the eyewear assembly so the lenses can be removed without the use of a tool.

According to one embodiment, an eyewear assembly includes a frame with a upper frame portion and a lower frame portion, with two lenses retained between the upper and lower frame portions. A channel disposed on an inner perimeter of lens openings in the frame may retain the lenses in the frame. In some embodiments, the channels are rigid, while in other embodiments the channel may be flexible or have a compressible material to retain lenses of different shapes, sizes, and thicknesses.

The lenses may be thick protective lenses, cosmetic lenses, or prescription lenses, and multiple types of lenses may be used for the same type of eyewear assembly. In some embodiments, multiple lenses may be layered in a single eyewear assembly. For example, a cosmetic lens may be layered over a protective lens, and both lenses may be retained by the frame channel. Different lenses may be formed of different materials, such as glass, plastics, or composite materials.

The lenses are retained by the frame, which includes an upper frame portion and a lower frame portion that are separable at a bridge region in the central area of the frame. At the bridge region, the lower frame portion may be shaped to support the eyewear assembly on the user's nose. For example, nose pads may be attached directly to a surface of the lower frame. In other embodiments, a nosepiece extends from the frame, and the nosepiece rests on the user's nose.

In some embodiments, the upper and lower frame portions may be formed from a single, integral frame piece. In other embodiments, the upper frame portion and the lower frame portion may be formed as separate pieces and connected together during manufacturing. For example, the upper frame portion may be connected to the lower frame portion by a screw or other fastener at each lateral side of the frame.

The upper frame portion may be selectively separable from the lower frame portion in the bridge region by actuating a linkage. When the upper frame portion is in a closed position relative to the lower frame portion, the lenses are retained by the frame. When the linkage is actuated, the upper frame portion moves upwardly, and in some embodiments, forwardly, away from the lower frame portion in the bridge region. The bridge region may be the only location where the upper frame portion separates from the lower frame portion in some embodiments, though separation may occur elsewhere on the frame in other embodiments.

As described further below, the linkage may include links and joints which connect the upper frame portion to the lower frame portion. For example, a first link may be pivotally connected to the upper frame portion, and a second link may be pivotally connected to the lower frame portion, and the first and second links may be pivotally connected to each other. Actuating the linkage by moving the second link upwardly pushes the first link, and therefore the upper frame portion, upwardly, separating the upper frame portion from the lower frame portion. The upper frame portion and lower frame portion remain connected to each other at the lateral ends of the frame near the temple bar connection locations. At least one of the upper frame portion or lower frame portion may have a degree of flexibility that allows the separation.

Separating the upper frame portion from the lower frame portion may cause the upper frame portion to substantially disengage from the lenses while the lenses remain in the channel of the lower frame portion. In another embodiment, the lenses are retained in the channel of the upper frame portion, while the edges of the lenses connected to the lower frame portion are exposed.

According to some embodiments, the linkage has a finger actuator extending from the second link, and the user pushes or pulls on the actuator to move the frame from the closed to open configuration or vice versa. The finger actuator may be configured to operate as a lever to provide a mechanical advantage to the user. In one embodiment, the finger actuator is attached to the second link, and the first link is curved. The finger actuator may form a second class lever with a fulcrum of the lever formed by the pivotal connection of the second link to the lower frame portion.

The nosepiece may be used as the finger actuator in some embodiments. That is, arms may extend from the linkage and form a nosepiece shaped to rest on the user's nose. The nosepiece may include padding and/or may be bendable. In one embodiment, the user actuates the finger actuator to move the upper frame portion upwardly and forwardly away from the lower frame portion in the bridge region by rotating the nosepiece upwardly. In other embodiments, the finger actuator may be a component that is not part of the nosepiece. For example, one or more arms may extend downwardly from the linkage and be positioned against a rearwardly-facing surface of the lower frame portion in some embodiments.

In some embodiments, the eyewear assembly may have a stable open configuration where the upper frame portion is stably positioned away from the lower frame portion without the user needing to hold the assembly in the open position. In other embodiments, the linkage may be biased toward the closed configuration such that the user holds the frame in the open position when removing or inserting lenses.

At each lateral end of the frame, a temple bar may be attached, hingedly or otherwise, to support the eyewear assembly on a user's head. To improve the fit of the eyewear assembly, the temple bar may be elastic or moldable to allow a user to customize the temple bar.

Turning now to the figures, FIGS. 1-4 show an embodiment of the eyewear assembly in a closed configuration. A frame 10 is arranged to hold first and second lenses 8, 9 which are retained by an upper frame portion 12 and a lower frame portion 14. The upper frame portion includes a brow bar 11, and a bridge region 16 of the frame is located in a laterally centered region of the frame. A nosepiece 18 extends from the bridge region 16. In the illustrated embodiment, the lenses are completely surrounded by the frame. In alternative embodiments, portions of the lenses may not be bordered by the frame.

In the embodiment shown, exterior edges of the lenses are retained within channels in the interior perimeters of the upper frame portion 12 and the lower frame portion 14. In other embodiments, the lenses may be retained by protrusions that extend from the interior perimeter of the frame 10. At the lateral ends of the frame 10, temple bars 20 are connected to the upper frame portion 12. In another embodiment, the temple bars 20 may be connected to the upper frame portion 12 and the lower frame portion 14, or only to the lower frame portion 14.

Figure 5:
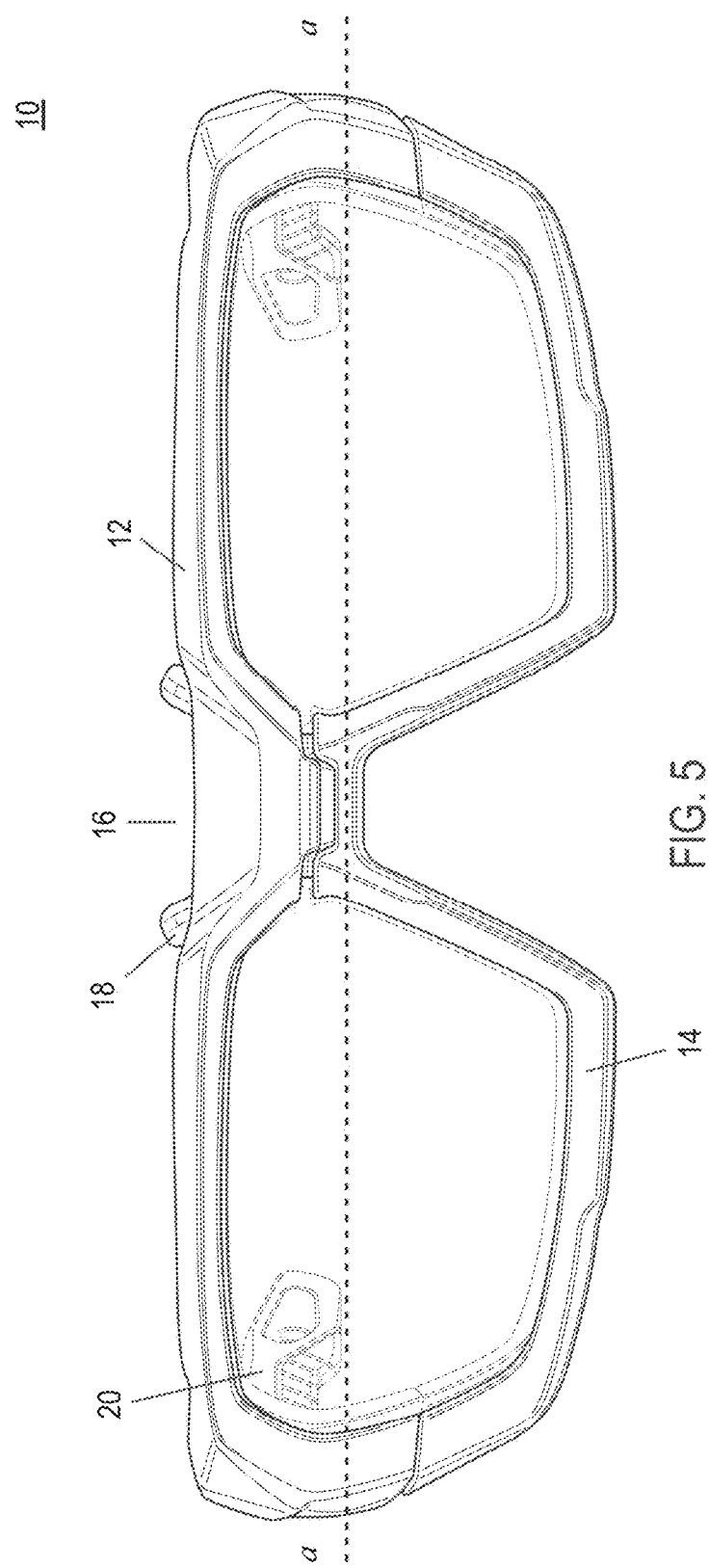
FIG. 5 is a front plan view of an eyewear assembly according to a second embodiment.
Figure 6:
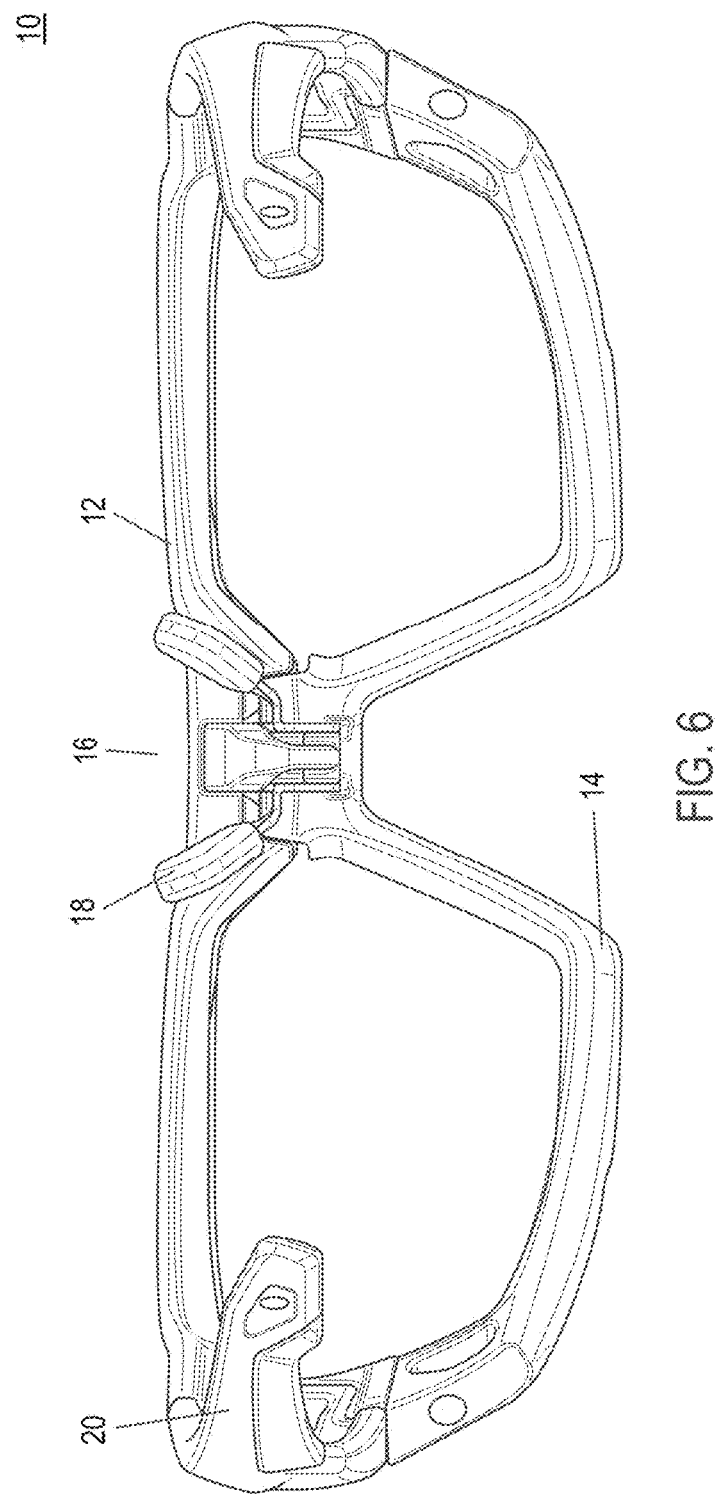
FIG. 6 is a rear plan view of an eyewear assembly according to the embodiment of FIG. 5.
Figure 7:
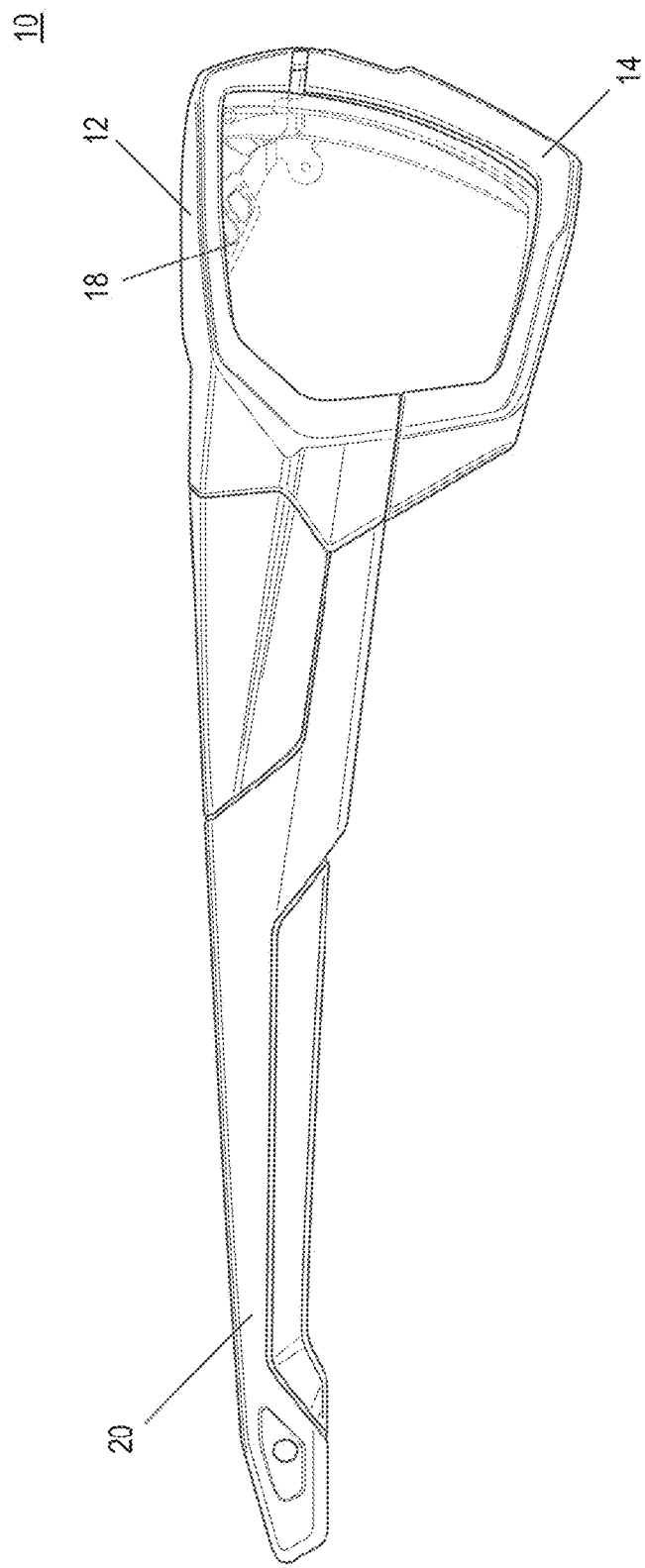
FIG. 7 is a rear plan view of an eyewear assembly according to the embodiment of FIG. 5.

According to some embodiments, the upper frame portion 12 is movable away from the lower frame portion 14 using a linkage 21 that connects the upper frame portion to the lower frame portion. FIGS. 5-7 show the frame in a partially open position. The linkage 21 may include one or more pivot joints which rotate about axes which are parallel to an imaginary line a that connects lateral ends of the frame at symmetrically opposite points. In the illustrated embodiment, the user rotates the nosepiece 18 upwardly to start separating the upper frame portion from the lower frame portion.

Figure 8:
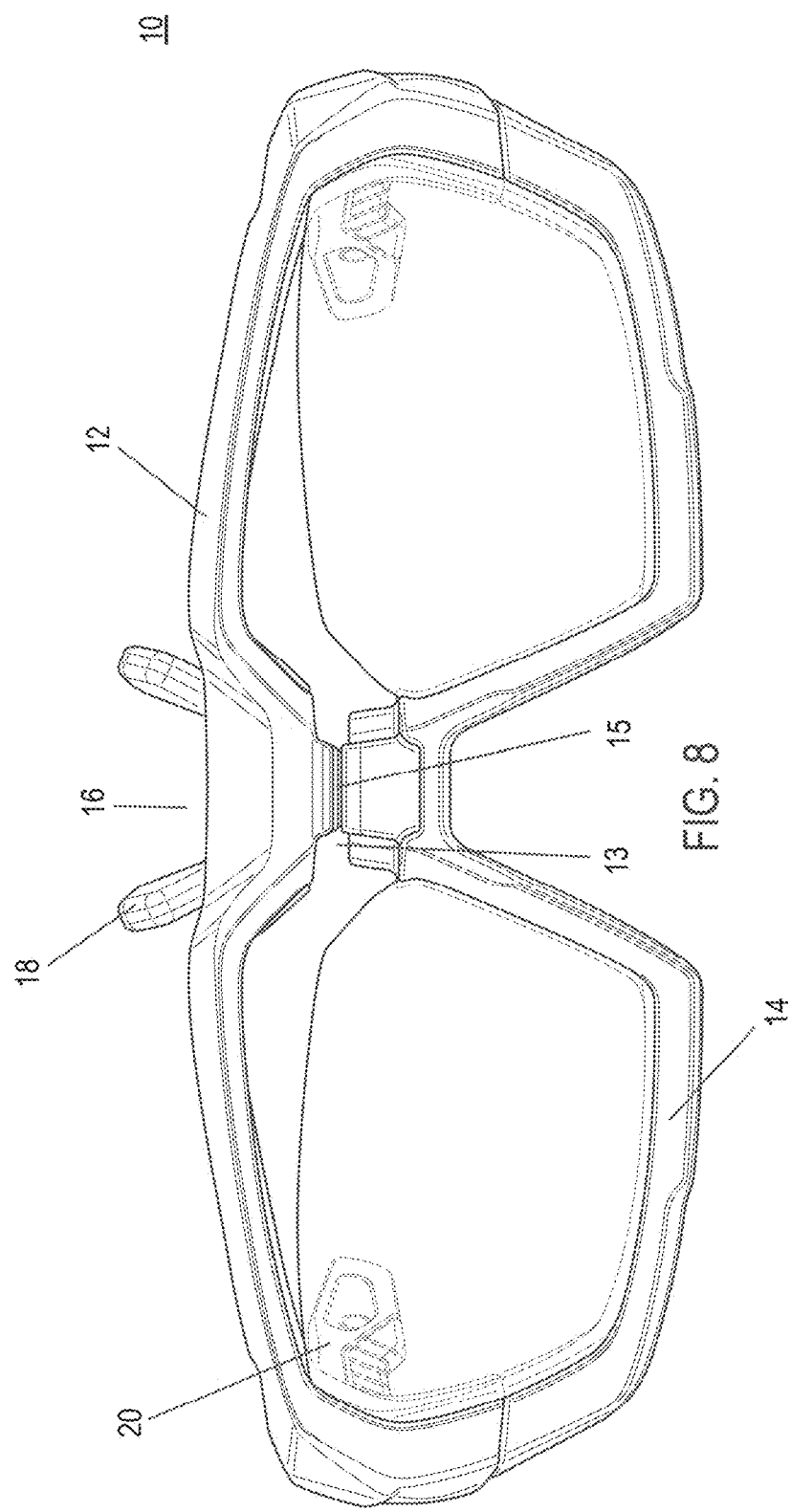
FIG. 8 is a front plan view of an eyewear assembly according to a third embodiment.
Figure 9:
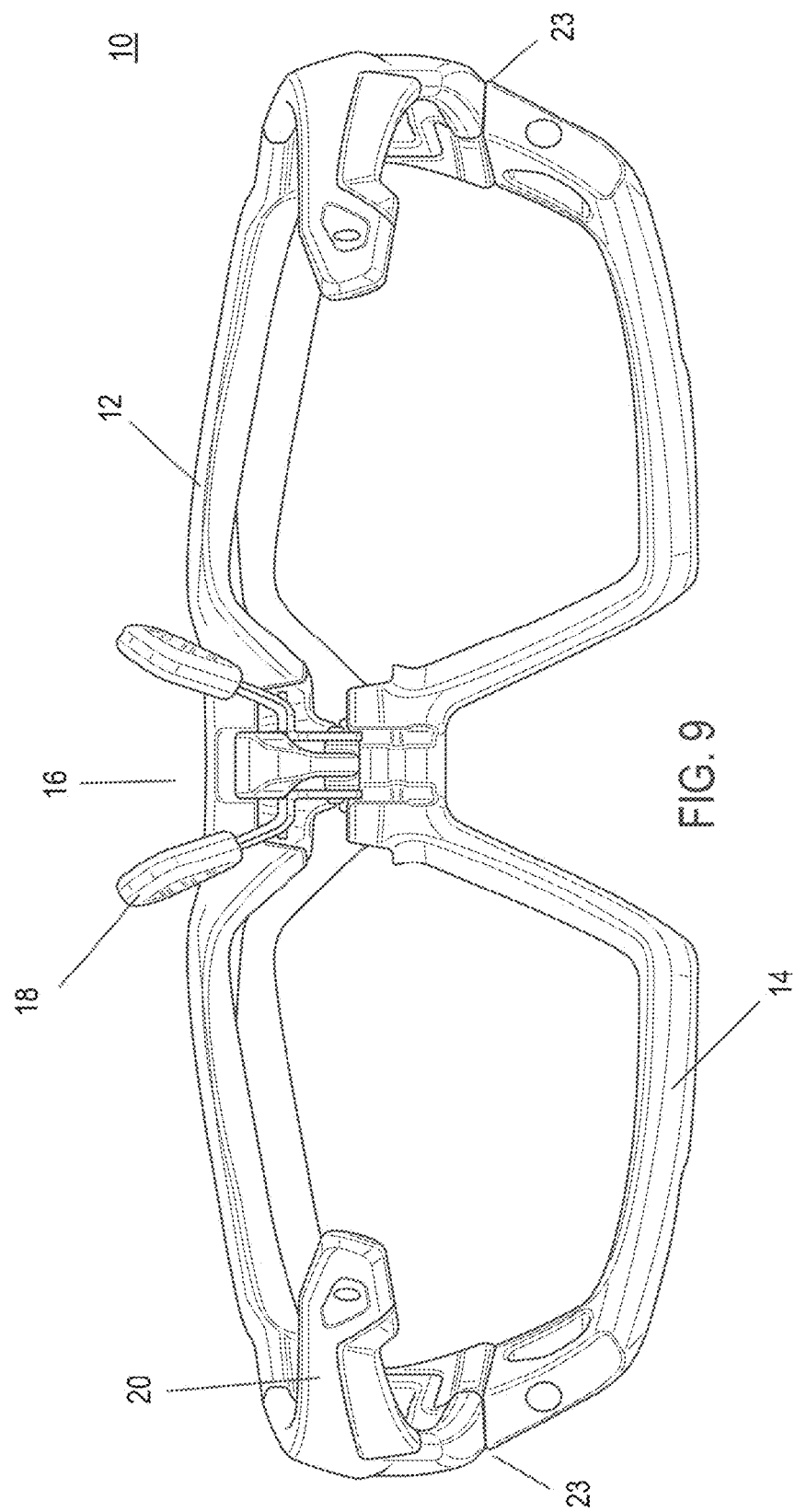
FIG. 9 is a rear plan view of the eyewear assembly of FIG. 8.
Figure 10:
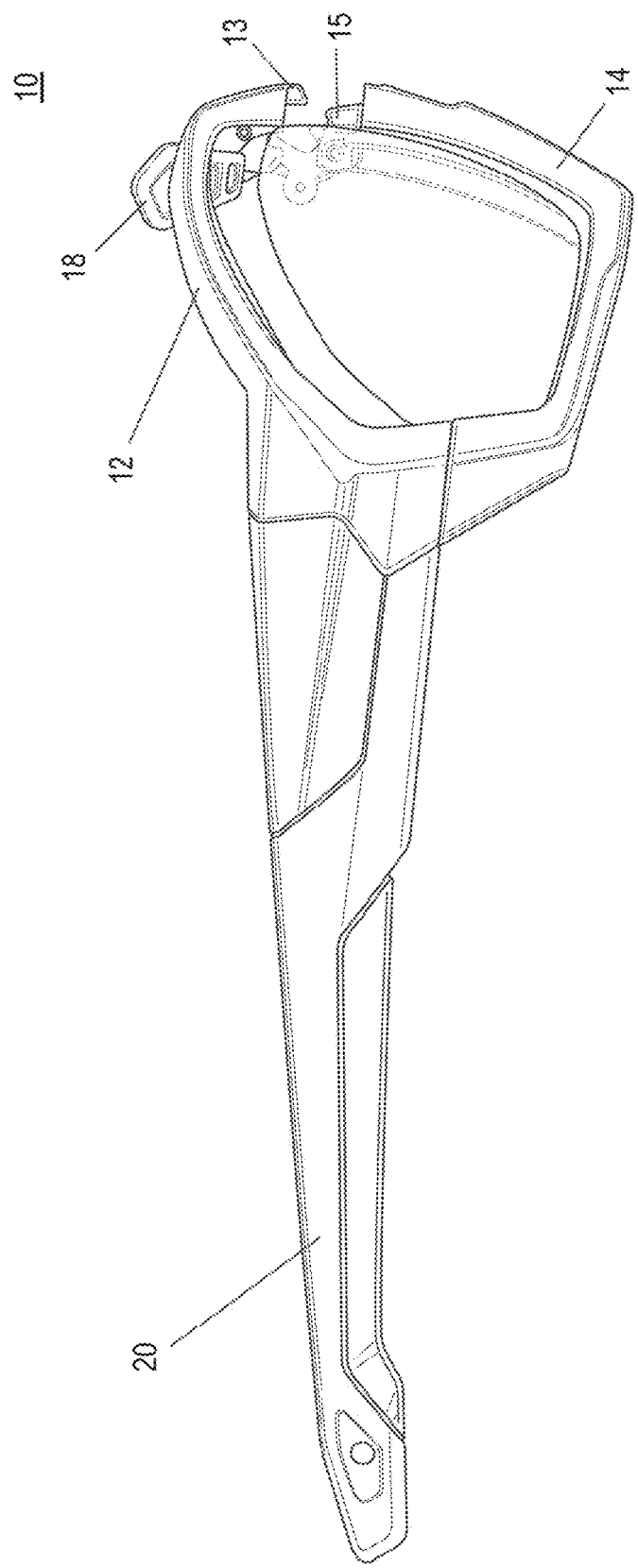
FIG. 10 is a left side elevation view of the eyewear assembly of FIG. 8.

FIGS. 8-10 show the frame 10 in an open position. The upper frame portion 12 has been flexed away from the lower frame portion 14, and the lenses 8, 9 can be removed by lifting them upwardly out of the lower frame portions. The upper frame portion 12 does not translate relative to the lower frame portion 14 at lateral ends of the frame near the connections of the temple bars in the illustrated embodiment. While the illustrated embodiment includes a linkage and a flexible brow bar that flexes in response to the actuation of the linkage, other embodiments may be include a brow bar that pivots at joints positioned near the temple bars. Still other embodiments may include an upper frame portion that translates upwardly relative to the lower frame portion, for example via a pin and slot arrangement located at lateral portions 23 of the frame.

When in the open position, a support surface 13 may be placed onto a resting surface 15 to temporarily hold the frame in the open position. In some embodiments, the support surface 13 includes a first component, such as a protrusion, that extends downwardly from the upper frame portion 12, and the resting surface 15 includes complementary component, such as a notch or a shelf, on the lower frame which receives the protrusion. In other embodiments, the support surface 13 may include a notch or shelf while the resting surface 15 includes a protrusion.

To retain the protrusion of the support surface 13, the notch of the resting surface 15 may include a blocking surface at a front of the notch arranged to prevent the protrusion from moving forward unless the upper frame portion is first moved upwardly and clear of the blocking surface. Because the internal stresses of the brow bar bias the protrusion downwardly when in the open position, and the blocking surface prevents forward movement, to move the upper frame portion 12 out of the open position and toward the closed position, the user pulls upwardly on the brow bar and/or rotates the linkage 21 further upwardly to remove the protrusion from the notch. The upper frame portion is then able to move forwardly and then downwardly back toward the closed position.

One embodiment of linkage 21 will now be described with references to FIGS. 11-13. Linkage 21 includes a first link 112 that is pivotally connected to the brow bar 11 at a first pivot joint 110. A second link 116 is connected to the lower frame portion 14 at a second pivot joint 114. The first and second links 112, 116 are connected together with a third pivot joint 118. Each of the pivot joints 110, 114, 116 may include a cylindrical rod connecting its respective components.

The curved shape of the first link 112 permits the third pivot joint 118 to be positioned below first pivot joint 110 and second pivot joint 114. By using a curved link, the linkage can function as an over-center device where rotation past a particular orientation in one direction tends to bias the linkage toward the open position, and/or rotation past a particular orientation in the other direction tends to bias the linkage toward the closed position. For purposes herein, the term "curved", as it relates to a link, is intended to encompass a link having a non-straight shape, and also a link made of two or more straight sections that give the link an overall bent shape.

Figure 11:
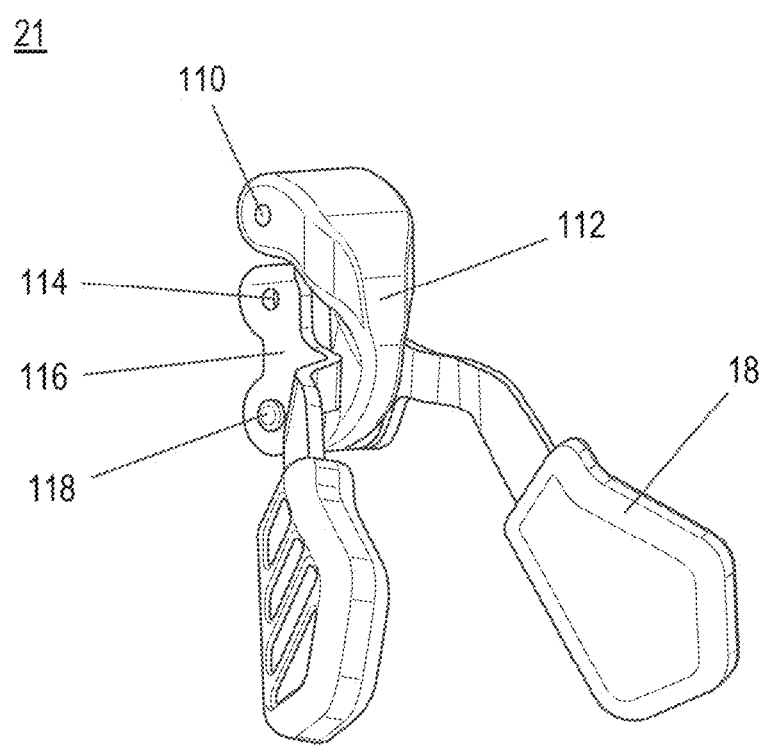
FIG. 11 shows a frame linkage in a closed position.
Figure 12:
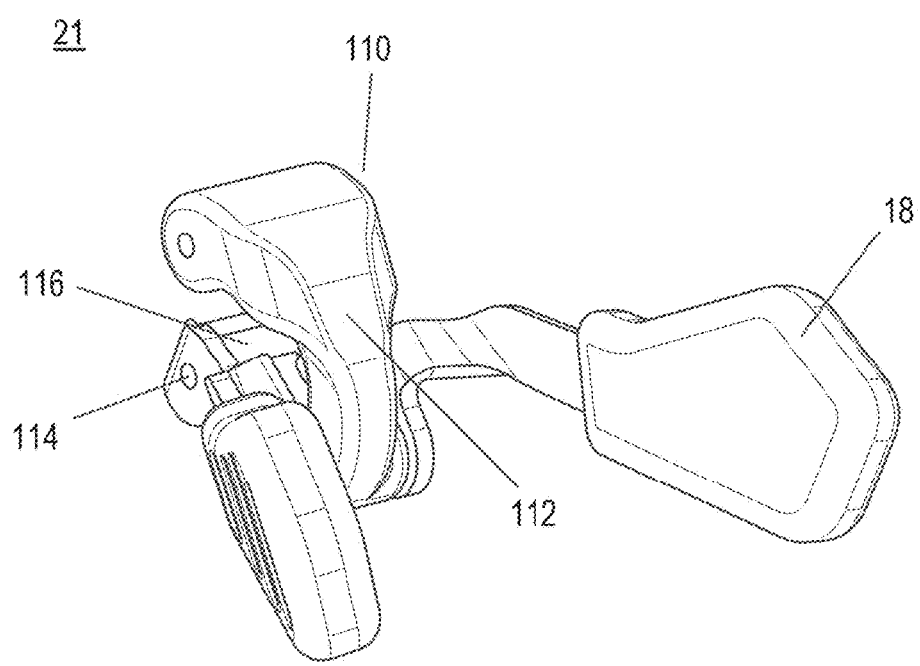
FIG. 12 shows the frame linkage of FIG. 11 in a partially opened position.

FIGS. 11, 12, and 13 show the linkage 21 in a closed position, a partially open position, and a fully open position, respectively. With the second link 116 attached to the lower frame portion at pivot joint 114, rotation of nosepiece 18 upwardly moves the first link 112 upwardly and forwardly. The attachment of the first link 112 to the brow bar 11 pushes the upper frame portion upwardly and forwardly, which separates the upper frame portion from the lower frame portion. In the illustrated embodiment, the first and second links remain pivotally connected to the upper and lower frame portions, respectively, when the frame is in the open position.

Once in an open position, to maneuver the support surface onto the resting surface, the user pulls the brow bar rearwardly which rotates the first link 112 about pivot joint 118, while the user holds the nosepiece to maintain the orientation of the second link 116. Then the user allows the second link 116 to rotate downwardly such that the support surface settles onto the resting surface.

The linkage 21 is arranged such that each of the first, second, and third pivot joints rotates about axes that are parallel to an imaginary line a connecting lateral ends of the frame at symmetrically opposite points. In some embodiments, other arrangements may be used where none, one, or two pivot joints of the linkage are parallel to an imaginary line connecting lateral ends of frame at symmetrically opposite points. In some embodiments, more than two links may be used as part of the linkage 21. In some embodiments, the nosepiece may act as one end of a first degree lever, and the linkage may include a single link rotating about a single pivot point. In such an embodiment, pushing downwardly on the nosepiece with the frame in the closed position may push the upper frame portion 12 toward the open position.

The pivotal connections of the first and second links 112, 116 to the upper and lower frame portions 12, 14, respectively, may be achieved with an arrangement other than a pivot joint. For example, laterally-oriented pins sliding through slots may be used for one or more pivotal connections, including the pivotal connection of the first link to the second link.

In some embodiments, the upper frame portion 12 may be brought in an open configuration in which the upper frame portion 12 is not held open by support and resting surfaces. In such embodiments, the lever may be rotated upwardly until a portion of the lever abuts the upper frame portion 12. To close the frame, the user may actuate the upper frame portion 12 rearwardly, causing the first linkage arm 112 to rotate in a rearward and downward direction, which draws the upper frame portion 12 rearwardly and upwardly. In this configuration, the distance between the upper frame portion 12 and the lower frame portion 14 may be increased to allow the lenses 8, 9 to be removed easily.

In the embodiment shown in FIGS. 8-11, returning the frame to the closed configuration from the open configuration may be achieved by pushing the upper frame portion 12 forward to release the support surface from the resting surface, and then rotating the nosepiece 18 downwardly. The resilience of the upper frame portion may provide some or all of the force to rotate the nosepiece (or other finger actuator) in some embodiments.

In the bridge region, a rearwardly-facing surface of the upper frame portion 12 may be shaped to complement a frontwardly-facing surface of the lower frame portion 14 such that the two frame portions have substantially vertical surfaces which contact each other. To retain lenses within the frame, the channel of the upper frame portion 12 may engage the edges of the lenses prior to actuating the lever 18 downward. The linkage may be biased toward the closed configuration by the resilience of the frame portions. In some embodiments, springs, separate resilient elements, or other arrangements may be used to bias the linkage toward the closed configuration.

While the present teachings have been described in conjunction various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An eyewear assembly comprising:
a frame arranged to hold first and second lenses, the frame including an upper frame portion and a lower frame portion, the upper frame portion and the lower frame portion being separable at a bridge region to move the frame from a closed position to an open position, each of the first and second lenses being removable from the frame when the frame is in the open position; and
a linkage coupling the upper frame portion to the lower frame portion, wherein:
the linkage comprises a first link pivotally connected to the upper frame portion, and a second link pivotally connected to the lower frame portion, the second link being configured to pivot about an axis that is parallel to an imaginary line connecting symmetrically opposite points at lateral ends of the frame;
the first link is pivotally connected to the second link; and
upward rotation of the second link moves the frame toward the open position.

2. The eyewear assembly of claim 1, further comprising a finger actuator attached to the second link.

3. The eyewear assembly of claim 2, wherein the finger actuator forms a second class lever with a fulcrum formed by the pivotal connection of the second link to the lower frame portion.

4. The eyewear assembly of claim 2, wherein the finger actuator comprises a nosepiece.

5. The eyewear assembly of claim 1, wherein the linkage is configured to move the upper frame portion in a forward direction and an upward direction when moving the frame from the closed position to the open position.

6. The eyewear assembly of claim 1, wherein the first link remains pivotally connected to the upper frame portion when the frame is in the open position, and the second link remains pivotally connected to the lower frame portion when the frame is in the open position.

7. The eyewear assembly of claim 1, wherein the eyewear assembly has first and second temple bars connected to the frame at first and second temple bar connection locations, and the upper frame portion does not translate relative to the lower frame portion in the first and second temple bar connection locations when the upper frame portion is being moved to the open position.

8. The eyewear assembly of claim 1, wherein the first link is connected to the upper frame portion in the bridge region, and the second link is connected to the lower frame portion in the bridge region.

9. The eyewear assembly of claim 1, wherein the first link is curved.

10. The eyewear assembly of claim 1, wherein the first link is pivotally connected to the second link at a pivot axis.

11. The eyewear assembly of claim 1, wherein the first link is pivotally connected to the upper frame portion at a first pivot axis and the second link is pivotally connected to the lower frame portion at a second pivot axis, the second pivot axis being moveable relative to the first pivot axis when the frame moves from the closed position to the open position.

12. The eyewear assembly of claim 1, wherein the first link is pivotally connected to the upper frame portion at a first pivot axis, the second link is pivotally connected to the lower frame portion at a second pivot axis, and the first link is pivotally connected to the second link at a third pivot axis, the third pivot axis being moveable relative to the second pivot axis when the frame moves from the closed position to the open position.

13. An eyewear assembly comprising:
a frame arranged to hold first and second lenses, the frame including an upper frame portion, a lower frame portion, and a bridge that is separable into an upper bridge portion and a lower bridge portion; and
a linkage coupling the upper frame portion to the lower frame portion, the linkage comprising a first link pivotally connected to the upper frame portion, and a second link pivotally connected to the lower frame portion, and the first link being pivotally connected to the second link;
wherein:
the upper frame portion is moveable away from the lower frame portion in a bridge region in an upward direction to move the frame from a closed frame position to an open frame position such that the first and second lenses are removable from the frame, and to move the bridge from a closed bridge position to an open bridge position.

14. The eyewear assembly of claim 13, wherein the lower bridge portion includes a support surface and the upper bridge portion includes a resting surface, and wherein the support surface is positionable on the resting surface to hold the frame in the open frame position and to hold the bridge in the open bridge position.

15. The eyewear assembly of claim 14, wherein the resting surface comprises a notch.

16. The eyewear assembly of claim 15, wherein the support surface comprises a protrusion.

17. The eyewear assembly of claim 14, wherein the support surface comprises a notch.

18. The eyewear assembly of claim 13, wherein the first link is pivotally connected to the upper frame portion with a first pivot joint, and the second link is pivotally connected to the lower frame portion with a second pivot joint.

19. The eyewear assembly of claim 13, wherein the upper frame portion and the lower frame portion are not separated from one another at lateral end regions of the frame when the frame is in the open frame position.

20. The eyewear assembly of claim 13, further comprising a finger actuator attached to the second link, the finger actuator comprising a nosepiece.

21. The eyewear assembly of claim 13, wherein the first link is connected to the upper frame portion in the bridge region, and the second link is connected to the lower frame portion in the bridge region.

22. A method of removing first and second lenses from an eyewear assembly, the eyewear assembly including a frame having a first portion and a second portion, each of the first and second portions of the frame having an open position and a closed position, wherein the first lens is held by the first portion of the frame when the first portion of the frame is in the closed position, and the second lens is held by the second portion of the frame when the second portion of the frame is in the closed position, the method comprising:
- (a) actuating a single finger actuator to move an upper frame portion upwardly from a lower frame portion in a bridge region of the frame to simultaneously open each of the first and second portions of the frame to the open position; and
- (b) removing the first and second lenses from the frame, wherein the finger actuator actuates a linkage including:
  a first link pivotally connected to the upper frame portion; and
  a second link pivotally connected to the lower frame portion; wherein
  the first link is pivotally connected to the second link.

23. The method of claim 22, wherein the finger actuator is attached to the second link, and the first link is curved.

24. The method of claim 22, further comprising positioning a support surface of the upper frame portion on a resting surface of the lower frame portion to hold the frame in the open position.

25. The method of claim 22, wherein act (a) exposes at least one edge of each lens when the frame is in the open position.

26. A method of removing lenses from an eyewear assembly, the eyewear assembly including a frame having an open position and a closed position, wherein the lenses are held by the frame when the frame is in the closed position, the method comprising:
- (a) rotating a finger actuator about an axis that is parallel to an imaginary line connecting symmetrically opposite points at lateral ends of the frame to move an upper frame portion away from a lower frame portion in a bridge region of the frame; and
- (b) removing the lenses from the frame.

* * * * *